(12) United States Patent
Bregaint et al.

(10) Patent No.: US 7,078,886 B2
(45) Date of Patent: Jul. 18, 2006

(54) APPLIANCE FOR READING IDENTIFICATION CONNECTORS

(75) Inventors: Christian Bregaint, Nandy (FR); Patrice Cheminot, Vulaines (FR); Jean-Marc Druesne, Thomery (FR); Roger Menguy, Voisenon (FR)

(73) Assignees: Hispano-Suiza, Colombes (FR); SNECMA Services, Paris (FR)

( * ) Notice: Subject to any disclaimer, the term of this patent is extended or adjusted under 35 U.S.C. 154(b) by 0 days.

(21) Appl. No.: 10/687,995

(22) Filed: Oct. 20, 2003

(65) Prior Publication Data

US 2004/0133396 A1  Jul. 8, 2004

(30) Foreign Application Priority Data

Oct. 21, 2002  (FR) .................................. 02 13094

(51) Int. Cl.
  *G01R 19/00* (2006.01)
(52) U.S. Cl. ........................................ 324/66; 324/503
(58) Field of Classification Search ................ 324/66, 324/503, 691, 158.1, 73.1; 702/118
  See application file for complete search history.

(56) References Cited

U.S. PATENT DOCUMENTS

| 4,280,185 A * | 7/1981 | Martin .......................... 701/99 |
| 4,523,457 A * | 6/1985 | Bayer et al. .................... 73/114 |
| 4,571,488 A | 2/1986 | Reeves ......................... 219/544 |
| 4,720,253 A | 1/1988 | Koentges ...................... 425/564 |
| 4,787,053 A * | 11/1988 | Moore .......................... 701/123 |
| 5,014,794 A | 5/1991 | Hansson ........................ 173/18 |
| 5,146,172 A * | 9/1992 | Mehr-Ayin et al. .......... 324/691 |
| 6,044,700 A * | 4/2000 | Gen-Kuong et al. ....... 73/178 R |
| 6,407,554 B1 | 6/2002 | Godau et al. ................ 324/503 |
| 6,570,385 B1 * | 5/2003 | Roberts et al. .............. 324/378 |

FOREIGN PATENT DOCUMENTS

| EP | 0 366 854 | 5/1990 |
| EP | 1 151 920 | 11/2001 |
| EP | 1 246 345 | 10/2002 |

* cited by examiner

*Primary Examiner*—Walter Benson
(74) *Attorney, Agent, or Firm*—Oblon, Spivak, McClelland, Maier & Neustadt, P.C.

(57) ABSTRACT

In order to enable the information contained in an identification connector to be read in a manner that is more reliable, faster, and without risk of damage, the invention provides a reader appliance for reading identification connectors for airplane engines, the connector comprising a plurality of contacts connected to a decoding circuit, each contact corresponding to a binary digit, one or more of the binary digits corresponding to information relating to characteristics of the engine. The reader appliance comprises connection means suitable for receiving at least one identification connector, the connection means being connected to processor means responding to control members in order to display on a display device the information contained in the connector.

37 Claims, 6 Drawing Sheets

APPLIANCE FOR READING IDENTIFICATION CONNECTORS

FIELD OF THE INVENTION

The invention relates to the field of identification connectors as used in particular in airplane engines for parameterizing the engine controller. The invention relates more particularly to an appliance for reading the contents of such connectors prior to fitting the engine to the airplane. The invention can be used by an operator to verify the programming of modifiable fields.

BACKGROUND OF THE INVENTION

At present, in the aviation industry, in order to obtain better control over the costs of developing and manufacturing engines, a "basic" engine is designed from which families and versions of specific engines are derived. Similarly, the manufacturers of controllers have defined a single type of controller per basic engine, which controller is capable of functioning with the engine families and versions derived therefrom.

As a result, the controller must be parameterized as a function of the family and the version of any particular engine under consideration. For this purpose, an identification connector is used which is secured to the engine and which is connected to the controller. The identification connector contains information (in binary-encoded form) relating to the engine characteristics that are to be used by the controller.

Figure 8:
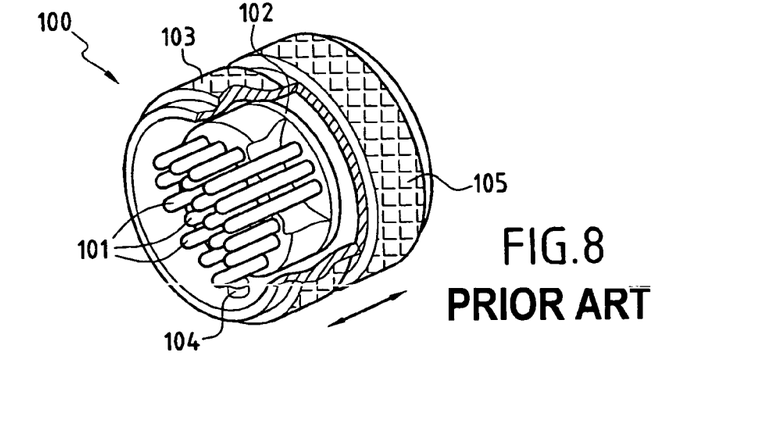
FIG. 8 is a fragmentary perspective view of an example of an identification connector for an airplane engine.

FIG. 8 shows an example of an identification connector of the kind to which the present invention applies. The identification connector 100 has a plurality of pins 101 which are connected to one another inside the connector by means of an electric circuit (not shown) that is optionally reprogrammable.

When the electric circuit is not reprogrammable, it is made up of discrete components such as fusible tracks interconnecting the pins of the connector. In conventional manner, information is encoded in the connector by causing some of the fusible tracks to melt. Thus, each pin of the connector corresponds to a binary digit (0 or 1). Once the connector is installed on the engine (i.e. connected to the controller), the controller interprets in binary the electrical connections defined inside the connector in order to acquire the characteristics of the engine.

When the electric circuit is reprogrammable, the binary data may be determined by a switch, for example.

The reliability of the information contained in the identification connector is of major importance, particularly since these connectors have identical keying systems so as to enable them to be installed on all of the controllers. It is the identification connector that serves to authorize or inhibit certain operating characteristics specific to each engine family and version. For example, an engine version or family defined for maximum thrust of 20,000 pounds might be associated with a connector that authorizes thrust up to 22,000 pounds or one that limits thrust to 18,000 pounds. Given that certain components of the engine are not adapted to delivering thrust above 20,000 pounds, or that limiting thrust to 18,000 pounds might prevent takeoff, it can be seen that providing the wrong connector can have severe consequences.

Prior to fitting the engine under the wing of an airplane, the operation of reading the identification connector serves to ensure that the engine has the right characteristics. Thus, it is possible to monitor the decisions that have been made on the basis of the egine control book and avoid fitting a wrong engine which would unacceptable given the downtime and cost that that represents.

At present, there are two ways of reading information contained in an identification connector. The first consists in reading the raw data (i.e. binary data) present in the connector manually. This operation is performed by an operator using an ohmmeter to measure the resistance of each contact of the connector. Once all of the data has been measured, the operator decodes the information using documents from the manufacturer in order to verify that the information encoded in the identification connector matches the characteristics of the engine with which it is associated. This first way of reading is a manual operation that is lengthy and implies a risk of error and of damage while measurements are being taken by the operator, in particular because the contacts within the connector are close together.

The second presently-known way of validating the data contained in an identification connector consists in installing the engine together with the controller fitted with the identification connector under the wing of an airplane in order to read the information encoded in the connector via the on-board computer. This solution is even more time-consuming than the first technique mentioned above. Installing an engine on an airplane and removing it leads to costs in terms of time and labor that are not acceptable in this type of industry.

OBJECT AND SUMMARY OF THE INVENTION

The invention seeks to remedy the above-mentioned drawbacks and to provide a device serving to make reading the information contained in an identification connector more reliable, faster, and without risk of damage, and without requiring other parts of the engine to be disassembled.

These objects are achieved by a reader appliance for reading identification connectors for airplane engines comprising a plurality of contacts connected to a decoding circuit, each contact corresponding to a binary digit, one or more of said binary digits corresponding to information relating to characteristics of the engine, the appliance including connection means suitable for receiving at least one identification connector, said connection means being connected to processor means responding to control members in order to display on a display device the information contained in the connector.

Thus, the present invention provides an appliance enabling the information contained in an identification connector to be read in the clear. Consequently, an operator can act in any location and at any time to verify whether the information in a connector is compatible relative to the characteristics of the engine on which it is to be connected.

According to a characteristic of the invention, the processor means include software means for decoding information relating to characteristics of the engine from the binary data read in the identification connector.

According to a particular aspect of the invention, the control members comprise one or more buttons for causing information encoded in the identification connector connected to the reader appliance to be displayed, successive items of information being displayed in response to successive presses on said button. Alternatively, in an automated version of the reader appliance, the control members may be software means enabling the items of information to be displayed one after another, or indeed all simultaneously on a suitable display device.

The identification connector may be a multipin connector. In which case, the connection means of the reader appliance comprise at least one multipin connector suitable for receiving the identification connector.

In an embodiment of the invention, the connection means comprise at least one connector each suitable for receiving at least one specific model of identification connector.

The processor means include software means for detecting the model of the identification connector connected to the appliance.

The processor means may also include software means for performing a parity test on the encoding circuit of the identification connector.

According to a characteristic of the invention, the reader appliance has at least one protection connector with an autotest circuit. For this purpose, the processor means include software means for testing the reader appliance by using the autotest circuit of the protection connector. The control members may include at least one button for causing the results of the test of the reader appliance to be displayed, or software means for automatically displaying the results, as described above.

According to a characteristic of the invention, the reader appliance may be fitted with link means enabling the above-described software to be updated.

BRIEF DESCRIPTION OF THE DRAWINGS

Other characteristics and advantages of the invention appear from the following description of particular embodiments of the invention given as non-limiting examples and with reference to the accompanying drawings, in which.

DETAILED DESCRIPTION OF AN EMBODIMENT

Figure 1:
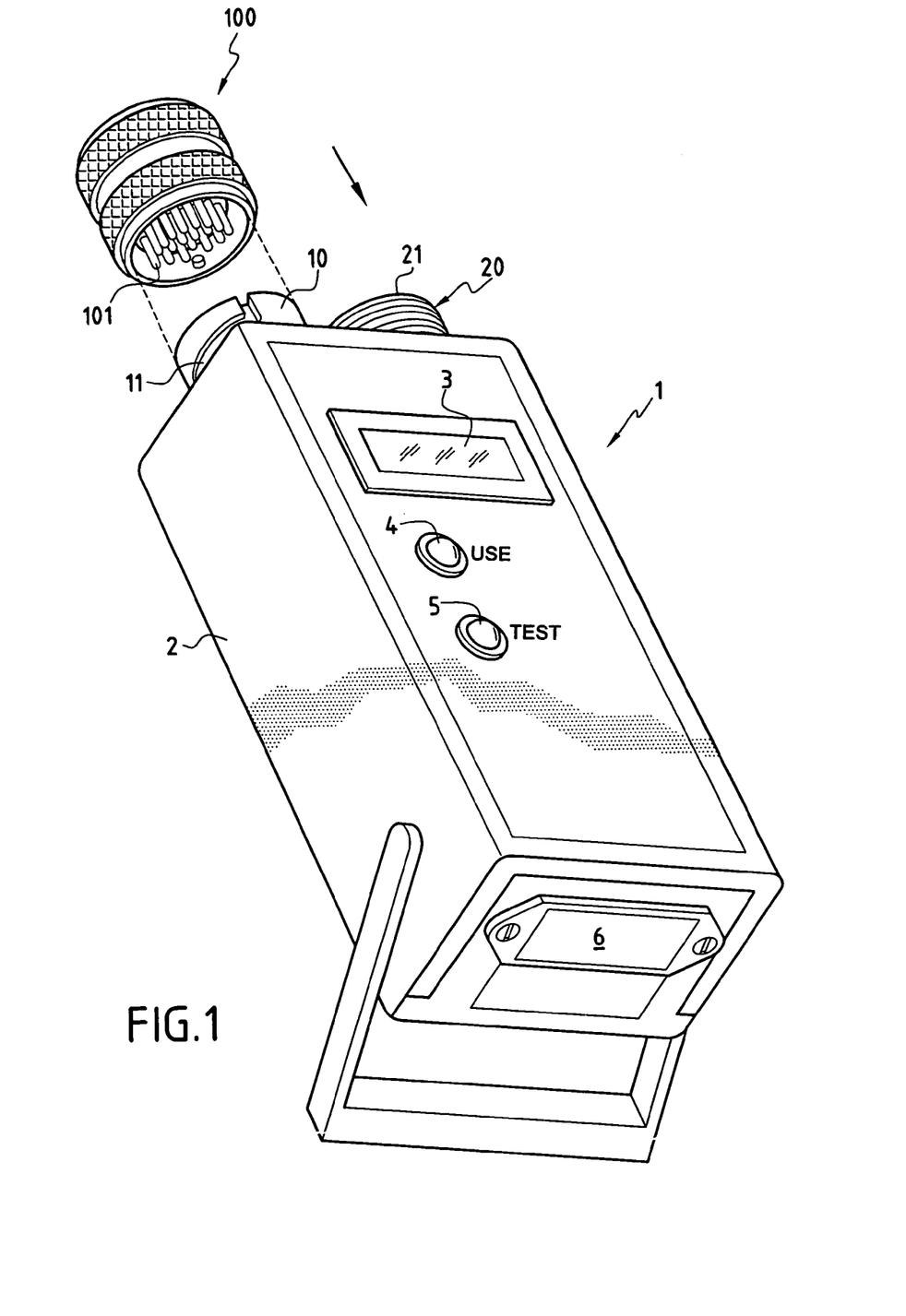
FIG. 1 is a perspective view of the identification connector reader appliance constituting an embodiment of the invention.

FIG. 1 shows a reader appliance 1 in accordance with the invention for reading identification connectors, the appliance being shown from beside its top face. The reader appliance 1 comprises a box 2 carrying two buttons 4 and 5 and a display 3 such as a liquid crystal display (LCD) screen, for example. The buttons 4 and 5 serve as control means made available to the operator for displaying information on the display 3. The box 2 also carries two connectors 10 and 20 for receiving and being fitted with identification connectors 100. Since the reader appliance of the invention is portable, the box 2 also carries independent power supply means, for example four 1.5 volt batteries which are housed in a drawer 6 inside the box 2. In a variant, the drawer 6 may constitute a housing for a rechargeable battery. In which case, the drawer 6 may include means for connection to a battery charger.

Figure 2:
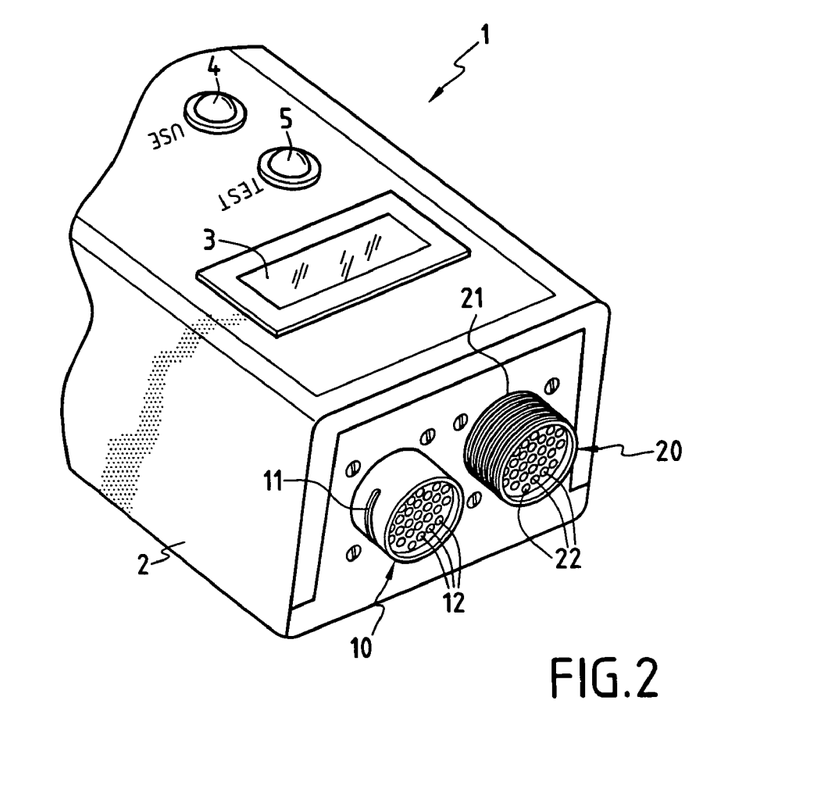
FIG. 2 is a perspective view of a portion of the reader appliance in an embodiment of the invention.

FIG. 2 shows the reader appliance for receiving the identification connector(s) to be tested. For this purpose, the box 2 has two connectors 10 and 20 (male or female depending on circumstances) secured to its front face. As shown in FIG. 8, an identification connector 100 is in the form of a male connector having a plurality of pins 101 disposed within a body 105. In other circumstances the connector 100 could equally well be a female connector. The body 105 of the connector contains an electric circuit for encoding data, which circuit is connected to the hidden ends of the pins 101. The portion of the body 105 which surrounds the pins 101 is in the form of a ring 103 that is free to turn. In the embodiment of the identification connector shown in FIG. 8, the ring 103 carries bayonet studs 104 designed to co-operate with grooves 11 in the corresponding connector 10. Nevertheless, depending on the model of connector, the fastening means may take on a variety of forms, for example they may be in the form of a screw thread. Under such circumstances, and as shown for the connector 20 of the appliance shown in FIG. 2, the connector has a corresponding screw thread 21 onto which the identification connector is screwed. Each of the connectors 10 and 20 has a respective plurality of contact sockets 12 or 22 for receiving the pins of the connector, thereby establishing an electrical connection between the reader appliance 1 and the encoding circuit of the identification connector.

Figure 4:
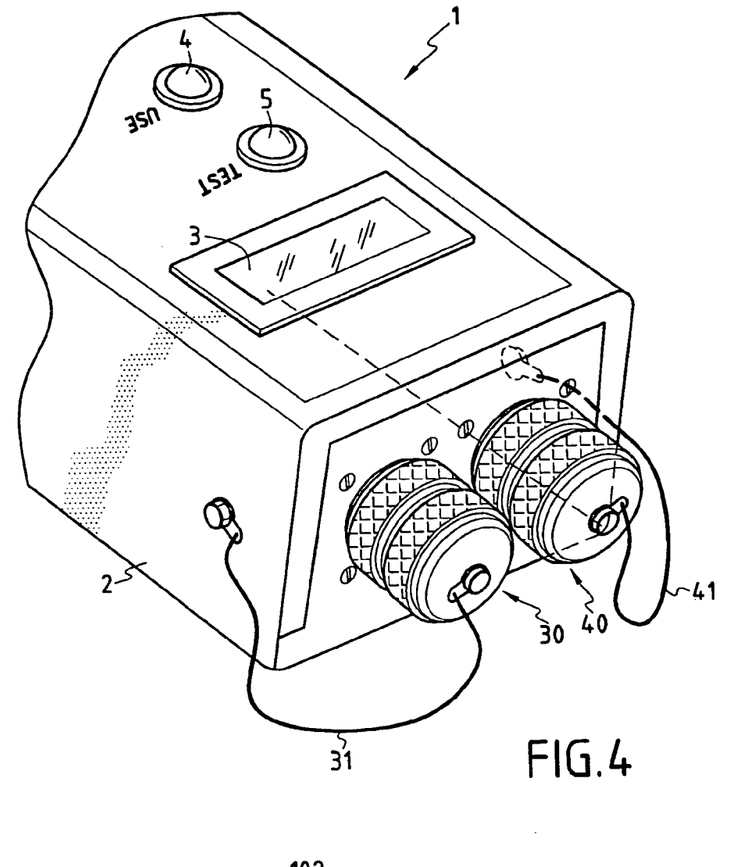
FIG. 4 is a perspective view of a portion of the reader appliance fitted with autotest connectors in an embodiment of the invention.

When the reader appliance 1 is not in use, the connectors 10 and 20 are provided with respective protection connectors 30 and 40 as shown in FIG. 4. Each protection connect 30, 40 is permanently attached to the box 2 by a respective attachment system 31, 41 such as a cable or the like. In addition to their protection function, the connectors 30 and 40 contain respective decoding circuits containing information enabling the reader appliance to perform an autotest as explained in greater detail below. For this purpose, the decoding circuit may be constituted, for example, by a blank circuit in which all of the discrete elements are in the 1 state. This function of the protection connectors enables the operator to verify that the reader appliance is operating properly prior to undertaking an operation of reading identification connectors that are to be verified.

Figure 5:
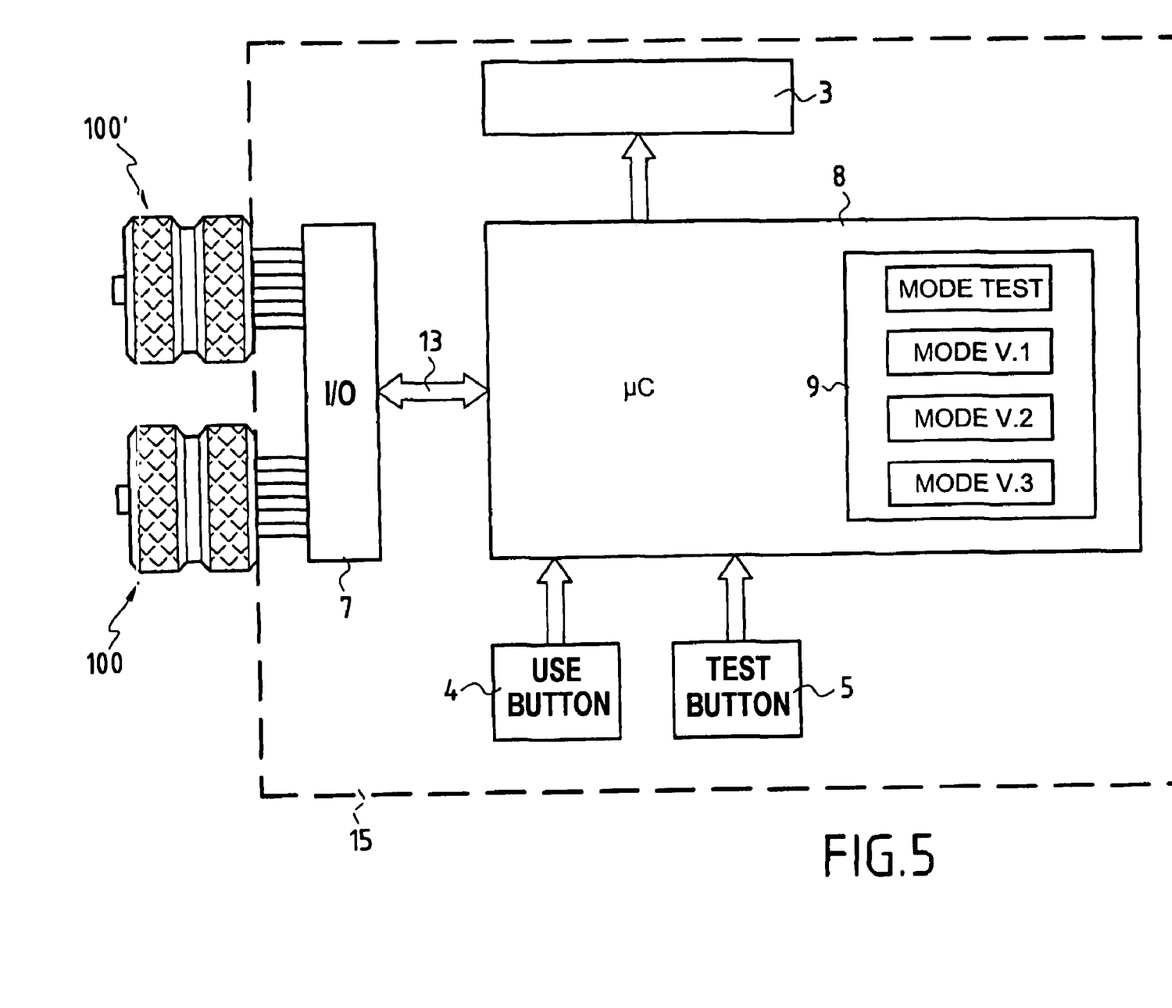
FIG. 5 is a block diagram of the control circuit of a reader appliance constituting an embodiment of the invention.

FIG. 5 shows the main components that are implemented in the electronic circuit of the reader appliance of the present invention. Connector 100' is also illustrated. The circuit 15 comprises a microcontroller 8 for running programs stored in an associated memory unit 9. In the example shown, the memory of unit 9 contains mainly a reader program (MODE TEST) for connectors fitted with an autotest circuit, and three reader programs (MODE V.1, MODE V.2, and MODE V.3) for reading identification connectors each corresponding to a specific model of connector.

The appliance of the invention may advantageously include link means (not shown), such as a serial RS232 port, connected to the microcontroller and enabling the programs in the appliance to be updated.

The microcontroller 8 reads the data contained in the identification connectors via a bus 13 and an input/output (I/O) interface 7 which may be constituted by a diode matrix, for example. More precisely, each time an operator presses one of the buttons 4 or 5, the microcontroller 8 reads and decodes the binary data of the identification connector corresponding to the information requested by the program. Once the data has been decoded, the microcontroller displays the corresponding information on the display 3.

Alternatively, in an automated version of the reader appliance, the control members may be software means enabling items of information to be displayed one after another, or indeed all together if the display device is of sufficient size.

Figure 6:
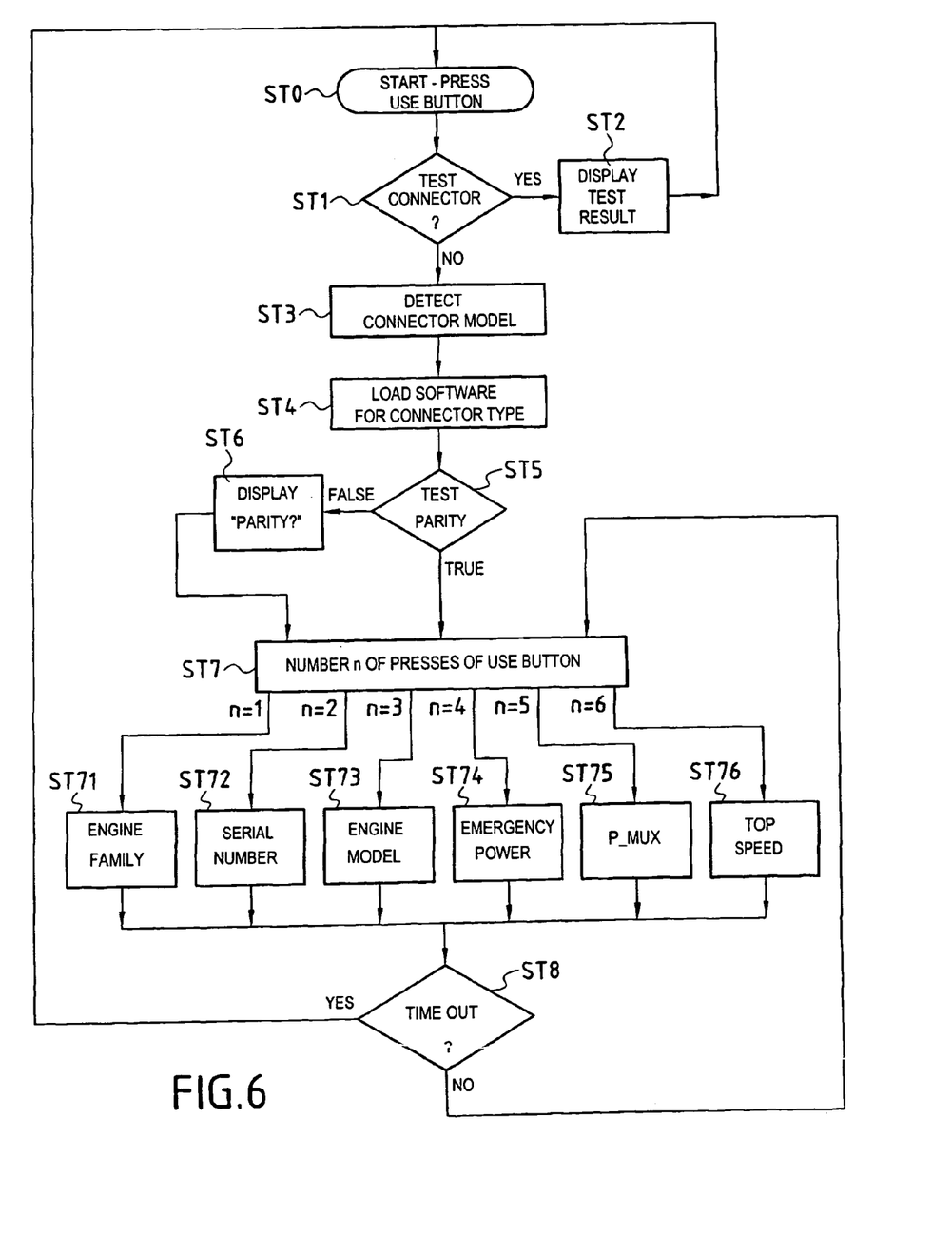
FIG. 6 is a flow chart showing the steps of reading and verifying identification connectors in an embodiment of the invention.

The method of reading the information contained in an identification connector as implemented in the appliance of the invention is described below with reference to FIG. 6.

As described above, successive items of information are displayed each time an operator presses one of the buttons 4 or 5. For the operation of reading the information contained in an identification connector that is to be verified, the operator makes use solely of the "USE" button 4. Thus, after placing the identification connector on one of the female connectors of the appliance, the operator presses the "USE" button 4 a first time in an initial step ST0, which causes the main program of the microcontroller to be run. In a step ST1, the program detects whether the installed connector is a protection connector with an autotest circuit as for the connectors 30 and 40 shown in FIG. 4. If this is the case, then the result of the autotest is displayed on the display 3 in a step ST2. The appliance's autotest operation is described in greater detail below.

In order to detect the presence of connectors, the appliance reads the binary values on the contacts of the connectors 10 and 20. If all of these values are 0, then no connector is in place.

If the circuit of the detected connector is not recognized as being an autotest circuit, then the method moves onto step ST3 which consists in detecting the model of identification connector that is present in order to run the appropriate program for reading information. As for all of the information contained in the connector, the information specifying the version of the connector is obtained by interrogating one or more discrete elements of the circuit connected to the pins of the connector and forming a code which is interpreted by the program for the purpose of decoding and displaying the engine version concerned. More precisely, each pin of the connector is identified by a unique reference (e.g. a letter). Thus, by addressing one or more pins, the microcontroller can obtain the binary data it needs to interpret in order to obtain an item of information.

Figure 3:
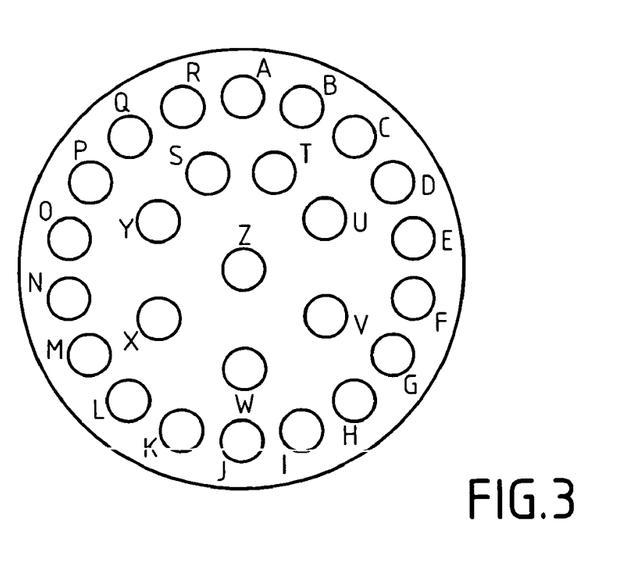
FIG. 3 is a diagrammatic face view of an identification connector showing one example of how its contact pins can be disposed.

By way of example, in a given range of engines, there are to be found several engine models, each of which corresponds to a specific identification connector. Each of these connectors contains a decoding circuit which defines characteristics specific to the engine model such as maximum authorized emergency power rating, tuning options, speed of rotation of the drive shaft, . . . . All of these characteristics are encoded in binary form in the discrete elements of the identification connector. FIG. 3 shows an example of an identification connector for engines comprising 26 pins each referenced by a letter in the range A to Z. In this example, it is assumed that the connector 20 in FIG. 2 is suitable for receiving identification connectors for two different engine models whereas the connector 10 is suitable for receiving identification connectors for a single engine model only. Thus, for example, on the connector 20, the value of the discrete element connected to the pin W determines the engine model that corresponds to the connector that is in place. In other words, if W=0, then the connector is a V.1 model, whereas if W=1, the connector corresponds to the V.2 model, for example.

Depending on which connector 10 or 20 is occupied, and, where appropriate, depending on data measured on the identification connector, the model (V.1, V.2, or V.3) of the identification connector is recognized by the microcontroller which then loads the software for reading the corresponding information from the memory unit 9 (step ST4).

The software begins by initiating a step ST5 for verifying parity which consists in adding all or some of the binary digits contained in the connector. If a parity problem is detected, then the microcontroller displays a message "PARITY?" (step ST6) on the display in order to inform the operator. The operation whereby the operator reads and verifies the information contained in the identification connector can then begin in a step ST7 where the number of incrementation operations to be performed by the operator on the "USE" button 4 is stored. Each time the USE button is pressed, the operator displays in succession each of the items of information contained in the connector, in an order that is defined by the software. In the example of FIG. 6, the software loaded into the microcontroller displays items of information in succession as a function of the number n of times the button has been incremented. In this example, six information messages are displayed in steps ST71 to ST76. They correspond respectively to the engine family (n=1), to the engine serial number (n=2), to the engine model (n=3), to its emergency power rating (n=4), to the type of link of its regulator (n=5), and to the speed rating of its high pressure shaft (n=6). More precisely, on each press of the button, the display 3 gives the name of the parameter followed by its value or its characteristics. If one of the items of information cannot be read (code not recognized), an error message is displayed instead of the corresponding information, thus information the operator that the connector is not valid.

When a parity problem is detected, the "PARITY?" message will continue to be displayed in alternation with the information read from the connector. Furthermore, in a step ST8, if the lapse of time between two successive presses on the button is greater than a determined duration, the appliance returns to its initial step ST0 which corresponds to a standby state.

The microcontroller 8 also contains a program in its memory unit 9 which, in association with protection connectors fitted with an autotest circuit (e.g. a blank circuit having all of its discrete elements in the 1 state), serves to implement an autotest of the reader appliance 1. This operation of applying an autotest to the appliance is useful whenever there is any doubt concerning the operation of the appliance (e.g. it always finds a parity problem). The autotest is also useful for monitoring the appliance after a modification (e.g. replacing the microcontroller or the batteries).

Figure 7:
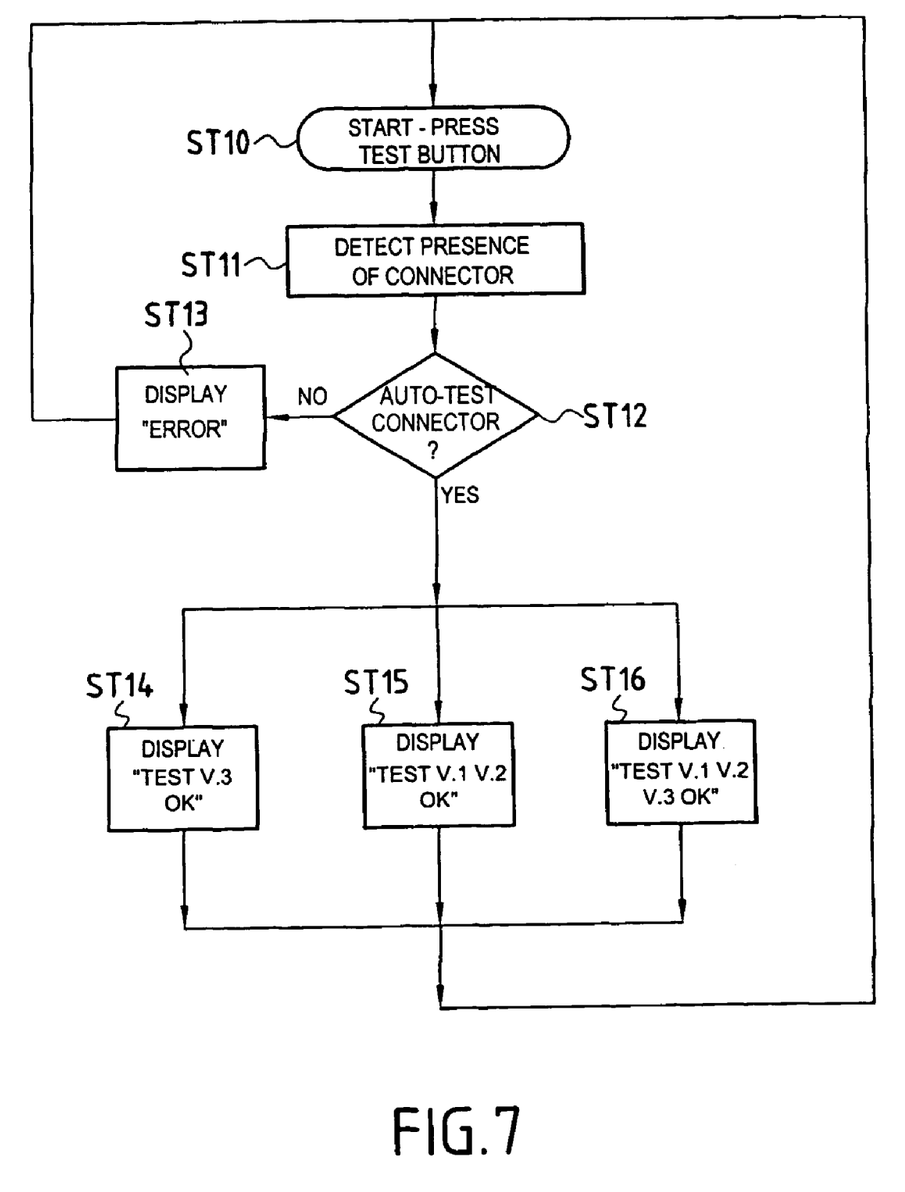
FIG. 7 is a flow chart showing the steps in a procedure for testing the reader appliance in an embodiment of the invention.

FIG. 7 shows the steps in the operation of autotesting the appliance. After the "TEST" button 5 of the reader appliance has been pressed, the "MODE TEST" program is executed from the memory unit 9 in the microcontroller (step ST10). This autotest program is also executed in the microcontroller when a protection connector with an autotest circuit is detected in step ST1 of FIG. 5.

In a step ST11, the program detects the location of the connector on the appliance. As for the example described above with reference to FIG. 5 and relating to the appliance illustrated in FIG. 2, the connector 20 of FIG. 2 is suitable for receiving identification connectors of versions V.1 and V.2, whereas the connector 10 is suitable for receiving identification connectors of version V.3 only. Once a connector has been detected, a step ST12 of verifying the presence of an autotest connector is initiated. If the connector that is present is not detected as being an autotest connector (i.e. if all or at least some of its discrete elements are not at 1), then an error message is displayed on the appliance (step ST13). If the connector in place on the appliance is indeed detected as being an autotest connector (i.e. if all of its discrete elements to be taken into account are at 1), then a message giving the result of the test is displayed. Depending on whether one or two connectors are present on the appliance, the appliance displays an appropriate message. In the example described, if a single connector is connected to the connector 10, which is suitable for receiving identification connectors of type V.3 only, then the message "TEST V.3 OK" is displayed (step ST4). If a single connector is connected to the connector 20, which is suitable for receiving identification connectors of type V.1 or of type V.2, then the message "TEST V.1 V.2 OK" is displayed (step ST5). Finally, if two autotest connectors are connected to the two connectors 10 and 20 of the appliance, then the message "TEST V.1 V.2 V.3" is displayed (step ST6).

Thus, the reader appliance of the present invention constitutes a tool that is more reliable and more practical than the manual test methods for reading the information contained in an identification connector in any place and at any time for the purpose of ensuring that the information is compatible with the characteristics of the engine on which the connector is, or is about to be, installed. The information (parameter name and attribute) is displayed directly in the clear, thus making the task of verification easier for the operator.

What is claimed is:

1. A reader appliance for reading identification connectors for airplane engines, said connector comprising a plurality of contacts connected to a decoding circuit, each contact corresponding to a binary digit, one or more of said binary digits corresponding to information relating to characteristics of the engine, the appliance including connection means suitable for receiving at least one identification connector and at least one protection connector containing an autotest circuit, said connection means being connected to processor means responding to control members in order to display on a display device the information contained in the connector.

2. An appliance according to claim 1, wherein the processor means include software means for decoding information relating to characteristics of the engine from the binary data read in the identification connector.

3. An appliance according to claim 1, wherein the control members comprise at least one button for causing information encoded in the identification connector connected to the reader appliance to be displayed, successive items of information being displayed in response to successive presses on said button.

4. An appliance according to claim 1, wherein the processor means include software means for testing said reader appliance from the autotest circuit of the protection connector.

5. An appliance according to claim 4, wherein the control members include at least one button for causing the result of the test of the reader appliance to be displayed.

6. An appliance according to claim 4, wherein the control members include software means for automatically causing the result of the test of the reader appliance to be displayed.

7. An appliance according to claim 1, including means for updating the processor means.

8. The appliance according to claim 1, wherein the appliance is portable and the identification connector is removable from the engine.

9. An appliance according to claim 1, including a self-contained power supply.

10. An appliance configured to read an identification connector of an airplane engine, the connector comprising a plurality of contacts connected to a decoding circuit containing a plurality of information about the engine, the appliance comprising:

an identification connector receiver;
a processor connected to the identification connector receiver, the processor being configured to decode the plurality of engine information contained in the decoding circuit of the identification connector;
a control device configured to specify which information from the plurality is decoded by the processor;
a display unit configured to display at least one of the plurality of information about the engine decoded by the processor;
a self test button configured to initiate a self test of the processor; and
a self test connector configured to be connected to the identification connector receiver when performing a self test of the appliance.

11. The appliance according to claim 10, wherein the processor is further configured to identify a model of the identification connector and to decode the plurality of engine information contained in the decoding circuit of the identification connector based on the identified model of the identification connector.

12. The appliance according to claim 10, wherein the processor is further configured to automatically decode the plurality of information sequentially and the display is configured to display the plurality of information decoded by the processor.

13. The appliance according to claim 10, wherein the appliance is portable and the identification connector is removable from the engine.

14. The appliance according to claim 10, further comprising:

a link unit connected to the processor, the link unit being configured to update the processor.

15. The appliance according to claim 10, wherein the information related to characteristics of the engine comprises information to authorize or to inhibit engine operation.

16. The appliance according to claim 15, wherein the information to authorize or to inhibit engine operation comprises a maximum thrust level and/or a minimum thrust level.

17. An appliance configured to read an identification connector of an airplane engine, the connector comprising a plurality of contacts connected to a decoding circuit containing a plurality of information about the engine, the appliance comprising:

an identification connector receiver;
a processor connected to the identification connector receiver, the processor being configured to decode the plurality of information about the engine contained in the decoding circuit of the identification connector, the plurality of information about the engine including
a plurality of engine operating characteristics of a specified engine family or version;

a control device configured to specify which information from the plurality is decoded by the processor; and a display unit configured to display the plurality of information about the engine decoded by the processor, wherein the control device comprises at least one button configured to cause the plurality of information encoded in the identification connector connected to the reader appliance to be displayed, successive items of information being displayed in response to successive presses on the button.

18. The appliance according to claim 17, wherein the information relating to characteristics of the engine comprises information to authorize or to inhibit engine operation.

19. The appliance according to claim 18, wherein the information to authorize or to inhibit engine operation comprises a maximum thrust level and/or a minimum thrust level.

20. The appliance according to claim 17, wherein the plurality of engine operating characteristics includes at least one of a maximum authorized emergency power rating, a minimum thrust level, a tuning option, or a speed of rotation of a drive shaft.

21. The appliance according to claim 20, wherein the display unit displays a name of each engine operating characteristic of the plurality displayed followed by a corresponding value thereof.

22. The appliance according to claim 17, wherein the processor includes software for decoding the plurality of information about the engine contained in the identification connector.

23. The appliance according to claim 17, wherein the processor includes software detecting configured to detect the model of the identification connector connected to the appliance.

24. The appliance according to claim 17, including at least one protection connector containing an autotest circuit.

25. The appliance according to claim 24, wherein the processor includes software configured to test the reader appliance from the autotest circuit of the protection connector.

26. An appliance according to claim 25, wherein the control device includes at least one button configured to cause a result of the test of the reader appliance to be displayed.

27. An appliance according to claim 25, wherein the control device includes software configured to automatically cause a result of the test of the reader appliance to be displayed.

28. The appliance according to claim 17, wherein the processor is further configured to identify a model of the identification connector and to decode the plurality of engine information contained in the decoding circuit of the identification connector based on the identified model of the identification connector.

29. The appliance according to claim 17, further comprising:

a self test button configured to initiate a self test of the processor.

30. The appliance according to claim 29, further comprising:

a self test connector configured to be connected to the identification connector receiver when performing a self test of the appliance.

31. The appliance according to claim 17, wherein the appliance is portable and the identification connector is removable from the engine.

32. The appliance according to claim 17, further comprising:

a link unit connected to the processor, the link unit being configured to update the processor.

33. An appliance according to claim 17, wherein the processor includes software configured to decode information relating to characteristics of the engine from binary data read in the identification connector.

34. An appliance according to claim 17, wherein the control device comprises software configured to display information automatically.

35. An appliance according to claim 17, wherein the identification connector is a multipin connector, and wherein a connector of said appliance comprises at least one multipin connector configured to receive said identification connector.

36. An appliance according to claim 17, wherein a connector of said appliance comprises at least one connector configured to receive at least one specific model of identification connector.

37. An appliance according to claim 17, wherein the processor includes software configured to test the parity of the encoding circuit of the identification connector.

* * * * *